US012482470B2

(12) United States Patent
Wang et al.

(10) Patent No.: US 12,482,470 B2
(45) Date of Patent: Nov. 25, 2025

(54) SPEAKER-TURN-BASED ONLINE SPEAKER DIARIZATION WITH CONSTRAINED SPECTRAL CLUSTERING

(71) Applicant: Google LLC, Mountain View, CA (US)

(72) Inventors: Quan Wang, Hoboken, NJ (US); Han Lu, Santa Clara, CA (US); Evan Clark, San Francisco, CA (US); Ignacio Lopez Moreno, Brooklyn, NY (US); Hasim Sak, Santa Clara, CA (US); Wei Xia, Mountain View, CA (US); Taral Joglekar, Sunnyvale, CA (US); Anshuman Tripathi, Mountain View, CA (US)

(73) Assignee: Google LLC, Mountain View, CA (US)

( * ) Notice: Subject to any disclaimer, the term of this patent is extended or adjusted under 35 U.S.C. 154(b) by 512 days.

(21) Appl. No.: 17/644,261

(22) Filed: Dec. 14, 2021

(65) Prior Publication Data
US 2023/0089308 A1 Mar. 23, 2023

Related U.S. Application Data

(60) Provisional application No. 63/261,536, filed on Sep. 23, 2021.

(51) Int. Cl.
G10L 15/26 (2006.01)
G10L 15/06 (2013.01)
G10L 15/16 (2006.01)

(52) U.S. Cl.
CPC ............ *G10L 15/26* (2013.01); *G10L 15/063* (2013.01); *G10L 15/16* (2013.01); *G10L 2015/0631* (2013.01)

(58) Field of Classification Search
CPC ....... G10L 15/26; G10L 15/063; G10L 15/16; G10L 2015/0631; G10L 25/30; G10L 21/0272
See application file for complete search history.

(56) References Cited

U.S. PATENT DOCUMENTS

2008/0262828 A1* 10/2008 Och .................. G06F 40/47
704/3
2010/0291528 A1* 11/2010 Huerta ................ G09B 7/00
434/362

(Continued)

OTHER PUBLICATIONS

Grezes et al., "Let Me Finish: Automatic Conflict Detection Using Speaker Overlap," Aug. 2013, 5 pages.

(Continued)

Primary Examiner — Daniel C Washburn
Assistant Examiner — Paul J. Mueller
(74) Attorney, Agent, or Firm — Honigman LLP; Brett A. Krueger; Grant Griffith

(57) ABSTRACT

A method includes receiving an input audio signal that corresponds to utterances spoken by multiple speakers. The method also includes processing the input audio to generate a transcription of the utterances and a sequence of speaker turn tokens each indicating a location of a respective speaker turn. The method also includes segmenting the input audio signal into a plurality of speaker segments based on the sequence of speaker tokens. The method also includes extracting a speaker-discriminative embedding from each speaker segment and performing spectral clustering on the speaker-discriminative embeddings to cluster the plurality of speaker segments into k classes. The method also includes assigning a respective speaker label to each speaker segment clustered into the respective class that is different than the respective speaker label assigned to the speaker segments clustered into each other class of the k classes.

24 Claims, 5 Drawing Sheets

(56) References Cited

U.S. PATENT DOCUMENTS

| | | | | |
|---|---|---|---|---|
| 2014/0142944 | A1* | 5/2014 | Ziv | G10L 17/00 |
| | | | | 704/250 |
| 2016/0358619 | A1* | 12/2016 | Ramprashad | G10L 15/20 |
| 2018/0166066 | A1* | 6/2018 | Dimitriadis | G10L 25/78 |
| 2018/0174587 | A1 | 6/2018 | Bermundo | |
| 2019/0156832 | A1 | 5/2019 | Church et al. | |
| 2019/0156835 | A1 | 5/2019 | Church et al. | |
| 2019/0318725 | A1* | 10/2019 | Le Roux | G10L 15/16 |
| 2020/0219517 | A1* | 7/2020 | Wang | G10L 17/02 |
| 2022/0139380 | A1* | 5/2022 | Meng | G06N 3/044 |
| | | | | 704/232 |
| 2022/0278527 | A1* | 9/2022 | Knezovic | G01R 31/55 |
| 2022/0319535 | A1* | 10/2022 | Chawla | G10L 21/0272 |
| 2023/0153451 | A1* | 5/2023 | Malhotra | G06F 21/6245 |
| | | | | 726/26 |
| 2023/0297037 | A1* | 9/2023 | Huang | G05B 13/0255 |
| | | | | 705/7.41 |
| 2023/0386456 | A1* | 11/2023 | Weston | G10L 25/48 |

OTHER PUBLICATIONS

Apr. 21, 2022 Written Opinion (WO) of the International Searching Authority (ISA) and International Search Report (ISR) issued in International Application No. PCT/US2021/063343.

Huanru Henry Mao et al: "Speech Recognition and Multi-Speaker Diarization of Long Conversations", arxiv.org, Cornell University Library, 201 Olin Library Cornell University Ithaca, NY 14853, May 16, 2020 (May 16, 2020).

Tae Jin Park et al: "Speaker Diarization with Lexical Information", arxiv.org, Cornell University Library, 201 Olin Library Cornell University Ithaca, NY 14853, Apr. 13, 2020 (Apr. 13, 2020).

Laurent El Shafey et al: "Joint Speech Recognition and Speaker Diarization via Sequence Transduction", arxiv.org, Cornell University Library, 201 Olin Library Cornell University Ithaca, NY 14853, Jul. 9, 2019 (Jul. 9, 2019).

Wei Xia et al: "Turn-to-Diarize: Online Speaker Diarization Constrained by Transformer Transducer Speaker Turn Detection", arxiv.org, Cornell University Library, 201 Olin Library Cornell University Ithaca, NY 14853, Sep. 23, 2021 (Sep. 23, 2021).

* cited by examiner

SPEAKER-TURN-BASED ONLINE SPEAKER DIARIZATION WITH CONSTRAINED SPECTRAL CLUSTERING

CROSS REFERENCE TO RELATED APPLICATIONS

This U.S. Patent application claims priority under 35 U.S.C. § 119(e) to U.S. Provisional Application 63/261,536, filed on Sep. 23, 2021. The disclosure of this prior application is considered part of the disclosure of this application and is hereby incorporated by reference in its entirety.

TECHNICAL FIELD

This disclosure relates to speaker-turn-based online speaker diarization with constrained spectral clustering.

BACKGROUND

Speaker diarization is the process of partitioning an input audio stream into homogenous segments according to speaker identity. In an environment with multiple speakers, speaker diarization answers the question "who is speaking when" and has a variety of applications including multimedia information retrieval, speaker turn analysis, audio processing, and automatic transcription of conversational speech to name a few. For example, speaker diarization involves the task of annotating speaker turns in a conversation by identifying that a first segment of an input audio stream is attributable to a first human speaker (without particularly identifying who the first human speaker is), a second segment of the input audio stream is attributable to a different second human speaker (without particularly identifying who the second human speaker is), a third segment of the input audio stream is attributable to the first human speaker, etc.

SUMMARY

One aspect of the disclosure provides a computer-implemented method that when executed on data processing hardware causes the data processing hardware to perform operations for speaker-turn-based online speaker diarization. The operations include receiving an input audio signal that corresponds to utterances spoken by multiple speakers. The operations also include processing, using a speech recognition model, the input audio signal to jointly generate as output from the speech recognition model a transcription of the utterances and a sequence of speaker turn tokens. Each speaker turn token indicates a location of a respective speaker turn detected in the transcription between a respective pair of adjacent terms. The operations also include segmenting the input audio signal into a plurality of speaker segments based on the sequence of speaker tokens. For each speaker segment of the plurality of speaker segments, the operations include extracting a corresponding speaker-discriminative embedding from the speaker segment. The operations also include performing spectral clustering on the speaker-discriminative embeddings extracted from the plurality of speaker segments to cluster the plurality of speaker segments into k classes. For each respective class of the k classes, the operations include assigning a respective speaker label to each speaker segment clustered into the respective class that is different than the respective speaker label assigned to the speaker segments clustered into each other class of the k classes.

Implementations of the disclosure may include one or more of the following optional features. In some implementations, the operations further include annotating the transcription of the utterances based on the speaker label assigned to each speaker segment. In some examples, each speaker turn token in the sequence of speaker turn tokens has a corresponding timestamp. In these examples, segmenting the input audio signal into the plurality of speaker segments based on the sequence of speaker turn tokens includes segmenting the input audio signal into initial speaker segments each bounded by the corresponding timestamps of a respective pair of adjacent speaker turn tokens in the sequence of speaker turn tokens. In some implementations, for each initial speaker segment that has a respective duration that exceeds a segment duration threshold, the operations further include segmenting the initial speaker segment into two or more reduced-duration speaker segments that have respective durations less than or equal to the segment duration threshold. Here, the plurality of speaker segments segmented from the input audio signal include the initial speaker segments that have respective durations less than or equal to the segment duration threshold and the reduced-duration speaker segments that are further segmented from any of the initial speaker segments having respective durations that exceed the segment duration threshold.

In some implementations, extracting a corresponding speaker-discriminative embedding from the speaker segment includes receiving the speaker segment as input to a speaker encoder model and generating the corresponding speaker-discriminative embedding as output from the speaker encoder model. In these implementations, the speaker encoder model includes a long-short term memory-based (LSTM-based) speaker encoder model configured to extract the corresponding speaker-discriminative embedding from each speaker segment. In some examples, the operations further include predicting a confidence of the respective speaker turn detected in the transcription for each speaker turn token in the sequence of speaker turn tokens generated as output from the speech recognition model and determining pairwise constraints based on the confidences predicted for the speaker turn token. Here, the spectral clustering performed on the speaker-discriminative embeddings is constrained by the pairwise constraints.

In some implementations, the speech recognition model includes a streaming transducer-based speech recognition model that includes: an audio encoder configured to receive as sequence of acoustic frames as input and generate, at each of a plurality of time steps, a higher order feature representations for a corresponding acoustic frame in the sequence of acoustic frames; a label encoder configured to receive a sequence of non-blank symbols output by a final softmax layer as input and generate a dense representation at each of the plurality of time steps; and a joint network configured to receive, as input, the higher order feature representation generated by the audio encoder at each of the plurality of time steps and the dense representation generated by the label encoder at each of the plurality of time steps and generate, at each of the plurality of time steps, a probability distribution over possible speech recognition hypotheses at the corresponding time step. Here, the audio encoder may include a neural network that has a plurality of transformer layers. In some examples, the label encoder includes a bigram embedding lookup decoder model.

The speech recognition model may be trained on training samples that each include training utterances spoken by two or more different speakers and are paired with a corresponding ground-truth transcription of the training utterances.

Here, each ground-truth transcription is injected with ground-truth speaker turn tokens that indicate location where speaker turns occur in the ground-truth transcriptions. Optionally, the corresponding ground-truth transcription of each training sample may not be annotated with any timestamp information.

Another aspect of the disclosure provides a system that includes data processing hardware and memory hardware storing instructions that when executed on the data processing hardware causes the data processing hardware to perform operations. The operations include receiving an input audio signal that corresponds to utterances spoken by multiple speakers. The operations also include processing, using a speech recognition model, the input audio signal to jointly generate as output from the speech recognition model a transcription of the utterances and a sequence of speaker turn tokens. Each speaker turn token indicates a location of a respective speaker turn detected in the transcription between a respective pair of adjacent terms. The operations also include segmenting the input audio signal into a plurality of speaker segments based on the sequence of speaker tokens. For each speaker segment of the plurality of speaker segments, the operations include extracting a corresponding speaker-discriminative embedding from the speaker segment. The operations also include performing spectral clustering on the speaker-discriminative embeddings extracted from the plurality of speaker segments to cluster the plurality of speaker segments into k classes. For each respective class of the k classes, the operations include assigning a respective speaker label to each speaker segment clustered into the respective class that is different than the respective speaker label assigned to the speaker segments clustered into each other class of the k classes.

Implementations of the disclosure may include one or more of the following optional features. In some implementations, the operations further include annotating the transcription of the utterances based on the speaker label assigned to each speaker segment. In some examples, each speaker turn token in the sequence of speaker turn tokens has a corresponding timestamp. In these examples, segmenting the input audio signal into the plurality of speaker segments based on the sequence of speaker turn tokens includes segmenting the input audio signal into initial speaker segments each bounded by the corresponding timestamps of a respective pair of adjacent speaker turn tokens in the sequence of speaker turn tokens. In some implementations, for each initial speaker segment that has a respective duration that exceeds a segment duration threshold, the operations further include segmenting the initial speaker segment into two or more reduced-duration speaker segments that have respective durations less than or equal to the segment duration threshold. Here, the plurality of speaker segments segmented from the input audio signal include the initial speaker segments that have respective durations less than or equal to the segment duration threshold and the reduced-duration speaker segments that are further segmented from any of the initial speaker segments having respective durations that exceed the segment duration threshold.

In some implementations, extracting a corresponding speaker-discriminative embedding from the speaker segment includes receiving the speaker segment as input to a speaker encoder model and generating the corresponding speaker-discriminative embedding as output from the speaker encoder model. In these implementations, the speaker encoder model includes a long-short term memory-based (LSTM-based) speaker encoder model configured to extract the corresponding speaker-discriminative embedding from each speaker segment. In some examples, the operations further include predicting a confidence of the respective speaker turn detected in the transcription for each speaker turn token in the sequence of speaker turn tokens generated as output from the speech recognition model and determining pairwise constraints based on the confidences predicted for the speaker turn token. Here, the spectral clustering performed on the speaker-discriminative embeddings is constrained by the pairwise constraints.

In some implementations, the speech recognition model includes a streaming transducer-based speech recognition model that includes: an audio encoder configured to receive as sequence of acoustic frames as input and generate, at each of a plurality of time steps, a higher order feature representations for a corresponding acoustic frame in the sequence of acoustic frames; a label encoder configured to receive a sequence of non-blank symbols output by a final softmax layer as input and generate a dense representation at each of the plurality of time steps; and a joint network configured to receive, as input, the higher order feature representation generated by the audio encoder at each of the plurality of time steps and the dense representation generated by the label encoder at each of the plurality of time steps and generate, at each of the plurality of time steps, a probability distribution over possible speech recognition hypotheses at the corresponding time step. Here, the audio encoder may include a neural network that has a plurality of transformer layers. In some examples, the label encoder includes a bigram embedding lookup decoder model.

The speech recognition model may be trained on training samples that each include training utterances spoken by two or more different speakers and are paired with a corresponding ground-truth transcription of the training utterances. Here, each ground-truth transcription is injected with ground-truth speaker turn tokens that indicate location where speaker turns occur in the ground-truth transcriptions. Optionally, the corresponding ground-truth transcription of each training sample may not be annotated with any timestamp information.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
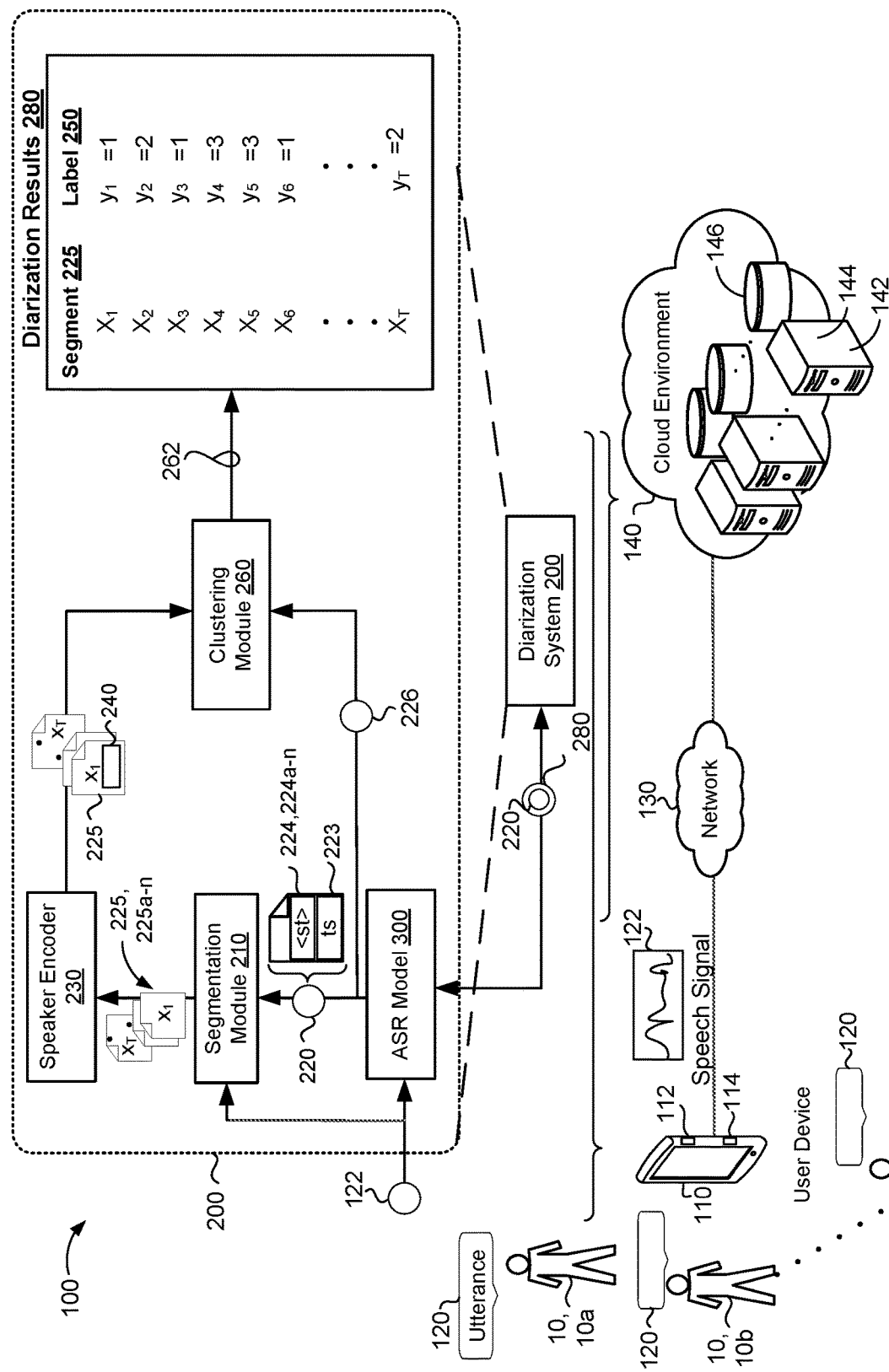
FIG. 1 is a schematic view an example speaker diarization system for performing speaker diarization.

Automatic speech recognition (ASR) systems generally rely on speech processing algorithms that assume only one speaker is present in a given input audio signal. An input audio signal that includes a presence of multiple speakers can potentially disrupt these speech processing algorithms, thereby leading to inaccurate speech recognition results output by the ASR systems. These ASR systems include a speaker diarization system to answer the question of "who is speaking when." As such, speaker diarization is the process of segmenting speech from multiple speakers engaged in a larger conversation to not specifically determine who is talking (speaker recognition/identification), but rather, determine when someone is speaking. Put another way, speaker diarization includes a series of speaker recognition tasks with short utterances and determines whether two segments of a given conversation were spoken by the same individual or different individuals, and is repeated for all segments of the conversation. Accordingly, speaker diarization detects speaker turns from a conversation that includes multiple speakers. As used herein the term 'speaker turn' refers to the transition from one individual speaking to a different individual speaking in a larger conversation.

Existing speaker diarization systems generally include multiple relatively independent components, such as, without limitation, a speech segmentation module, an embedding extraction module, and a clustering module. The speech segmentation module is generally configured to remove non-speech parts from an input utterance and divide the entire input utterance into fixed-length segments and/or word-length segments. Although dividing the input utterance into fixed-length segments is easy to implement, often times it is difficult to find a good segment length. That is, long fixed-length segments may include several speaker turns, while short segments include insufficient speaker information. Moreover, ASR models that generate word-length segments are usually spoken by a single speaker, however, individual words also include insufficient speaker information. The embedding extraction module is configured to extract, from each segment, a corresponding speaker-discriminative embedding. The speaker-discriminative embedding may include i-vectors or d-vectors.

The clustering modules employed by the existing speaker diarization systems are tasked with determining the number of speakers present in the input utterance and assign speaker identities (e.g., labels) to each segment. These clustering modules may use popular clustering algorithms that include Gaussian mixture models, links clustering, and spectral clustering. Speaker diarization systems may also use an additional re-segmentation module for further refining the diarization results output from the clustering module by enforcing additional constraints. The clustering module may execute online clustering algorithms that often have low quality or offline clustering algorithms that can only return diarization results at an end of an entire input sequence. In some examples, to achieve both high quality while minimizing latency, clustering algorithms are run offline in an online fashion. For instance, responsive to receiving each speaker-discriminative embedding, the clustering algorithm runs offline on the entire sequence of all existing embeddings. Implementing these examples, however, can be very computationally expensive if the sequence of speaker-discriminative embeddings is long.

Implementations herein are directed toward an online speaker diarization system that includes a speech recognition model that performs both speech recognition and speaker turn detection (i.e., when the active speaker changes) on received utterances spoken by multiple speakers. The speaker diarization system segments the utterances into speaker segments based on detected speaker turns and extracts speaker-discriminative embeddings therefrom. Advantageously, each speaker segment segmented from the utterances based on speaker turn detection include continuous speech from a speaker that carries sufficient information to extract robust speaker-discriminative embeddings. Moreover, for long duration conversational utterances, the number of speaker turns (i.e., number of speaker changes) is usually much smaller than the number of fixed-length segments, thereby reducing the computational cost of executing the clustering algorithm since speaker-discriminative embeddings are only extracted from the speaker segments which are bounded by the speaker turns.

In response to receiving a new speaker-discriminative embedding, the speaker diarization system executes spectral clustering on the entire sequence of all existing speaker-discriminative embeddings. Thus, the speech recognition model output speech recognition results and detected speaker turns in a streaming fashion to allow streaming execution of the spectral clustering. Advantageously, since the turn-wise speaker-discriminative embeddings are sparsely extracted from speaker segments (i.e., only after speaker turns), the sequence of all existing speaker-discriminative embeddings is relatively short even for relatively long conversations (i.e., multiple hours). Therefore, the execution of the online spectral clustering is computationally inexpensive while maintaining low latency such that the spectral clustering may be deployed on-device.

Moreover, training time is drastically reduced since a human annotator is not required to assign accurate timestamps to speaker turns and manually identify different speakers across these turns. Annotating time stamps and identifying speakers across turns is a time consuming process that may take about two hours for a single annotator to annotate 10 minutes of audio for one pass. Instead, the speech recognition model is trained to detect speaker turns from the semantic information conveyed in the speech recognition results such that each detected speaker turn is associated with a corresponding timestamp known by the speech recognition model. As such, these timestamps are not annotated by a human and can be used to segment the training audio data into corresponding speaker segments.

Referring to FIG. 1, a system 100 includes a user device 110 capturing speech utterances 120 from a group of speakers (e.g., users) 10, 10a-n and communicating with a cloud computing environment 140 via a network 130. The cloud computing environment 140 may be a distributed system having scalable/elastic resources 142. The resources 142 include computing resources 142 (e.g., data processing hardware) and/or storage resources 146 (e.g., memory hardware). In some implementations, the user device 110 and/or the cloud computing environment 140 executes a diarization system 200 that is configured to receive an input audio signal (i.e., audio data) 122 that corresponds to the captured utterances 120 from the multiple speakers 10. The diarization system 200 processes the input audio signal 122 and generates a transcription 220 of the captured utterances 120 and a sequence of speaker turn tokens 224, 224a-n. The speaker turn tokens 224 indicate a speaker turn (e.g., speaker change) detected in the transcription 220 between a respective pair of adjacent terms. Using the sequence of speaker turn tokens 224, the diarization system 200 segments the input audio signal 122 into a plurality of speaker segments 225, 225a-n each associated with a corresponding speaker discriminative embedding 240 extracted therefrom. Thereafter, the diarization system 200 generates diarization results 280 based on the speaker-discriminative embeddings 240 and pairwise constraints 226. The diarization results 280 include a corresponding speaker label 250 assigned to each speaker segment 225.

The user device 110 includes data processing hardware 112 and memory hardware 114. The user device 110 may include an audio capture device (e.g., microphone) for capturing and converting the utterances 120 from the speakers 10 into the audio data 122 (e.g., electrical signals). In some implementations, the data processing hardware 112 is configured to execute a portion of the diarization system 200 locally while a remaining portion of the diarization system 200 executes on the cloud computing environment 140. Alternatively, the data processing hardware 112 may execute the diarization system 200 in lieu of executing the diarization system 200 on the cloud computing environment 140. The user device 110 can be any computing device capable of communicating with the cloud computing environment 140 through the network 130. The user device 110 includes, but is not limited to, desktop computing devices and mobile computing devices, such as laptops, tablets, smart phones, smart speakers/displays, smart appliances, internet-of-things (IoT) devices, and wearable computing devices (e.g., headsets and/or watches).

In the example shown, the speakers 10 and the user devices 110 may be located within an environment (e.g., a room) where the user device 110 is configured to capture and covert speech utterances 120 spoken by the speakers 10 into the input audio signal 122 (also referred to as audio data 122). For instance, the speakers may correspond to co-workers having a conversation during a meeting and the user device 110 may record and convert the speech utterances into the input audio signal 122. In turn, the user device 110 may provide the input audio signal 122 to the diarization system 200 for predicting which speaker 10 is speaking for each segment of speech. Thus, the diarization system 200 is tasked with processing the input audio signal 122 to determine when someone is speaking without specifically determining who is talking via speaker recognition/identification.

In some examples, at least a portion of the utterances 120 conveyed in the input audio signal 122 are overlapping such that at a given instant in time, voices of two or more of the speakers 10 are active. Notably, a number N of the multiple speakers 10 may be unknown when the input audio signal 122 is provided as input to the diarization system 200 and the diarization system may predict the number N of the multiple speakers 10. In some implementations, the user device 110 is remotely located from the speakers 10. For instance, the user device may include a remote device (e.g., a network server) that captures speech utterances 120 from speakers that are participants in a phone call or video conference. In this scenario, each speaker 10 (or group of multiple speakers 10) would speak into their own device (e.g., phone, radio, computer, smartwatch, etc.) that captures and provides the speech utterances 120 to the remote user device 110 for converting the speech utterances 120 into the audio data 122. Of course in this scenario, the utterances 120 may undergo processing at each of the user devices and be converted into corresponding input audio signals 122 that are transmitted to the remote user device 110 which may additionally process the input audio signal 122 provided as input to the diarization system 200.

In the example shown, the diarization system 200 includes an ASR model 300, a segmentation module 210, a speaker encoder 230, and a clustering module 260. The ASR model 300 is configured to receive the input audio signal 122 and process the input audio signal 122 to jointly generate a transcription 220 of the utterances 120 and a sequence of speaker turn tokens 224, 224a-n. The ASR model 300 may include a streaming ASR model 300 that jointly generates the transcriptions 220 and the speaker turn tokens 224 in a streaming fashion as the input audio signal 122 is received. The transcription 220 includes the sequence of speaker turn tokens 224 that indicates a location of a respective speaker turn detected in the transcription 220 between a respective pair of adjacent terms. For example, the utterance 120 may include "hello how are you I am good" and the ASR model 300 generates the transcription 220 "hello how are you <st> I am good." In this example, <st> represents a speaker turn token 224 indicating the speaker turn between the adjacent terms 'you' and 'I.' Each speaker turn token 224 in the sequence of speaker turn tokens 224 may also include a corresponding timestamp 223.

Optionally, the ASR model 300 may utilize the diarization results 280 for improving speech recognition on the audio data 122. For instance, the ASR model 300 may apply different speech recognition models (e.g., language models, prosody models) for different speakers identified from the diarization results 280. Additionally or alternatively, the ASR model 300 and/or the diarization system 200 (or some other component) may index the transcription 220 of the audio data 122 using the speaker labels 250 of each speaker segment 225. For instance, a transcription of a conversation between multiple co-workers (e.g., speakers 10) during a business meeting may be indexed by speaker to associate portions of the transcription 220 with the respective speaker 10 for identifying what each speaker said.

The ASR model 300 may include any transducer-based architecture including, but not limited to, transformer-transducer (T-T), recurrent neural network transducer (RNN-T), and/or conformer-transducer (C-T). The ASR model 300 is trained on training samples that each include training utterances spoken by two or more different speakers 10 paired with a corresponding ground-truth transcription of the training utterances. Each ground-truth transcription is injected with ground-truth speaker turn tokens that indicated locations where speaker turns occur in the ground-truth transcription. Here, the corresponding ground-truth transcription of each training sample is not annotated with any timestamp information.

The segmentation module 210 is configured to receive the audio data 122 corresponding to the speech utterance 120 (also referred to as 'utterance of speech') and segment the audio data 122 into a plurality of speaker segments 225, 225a-n. The segmentation module 210 receives the audio data 122 and the transcription 220 that includes the sequence of speaker turn tokens 224 with the corresponding timestamps 223 to segment the audio data 122 into a plurality of speaker segments 225. Here, each speaker segment 225 corresponds to audio data between two speaker turn tokens 224. Optionally, the segmentation module 210 may further remove non-speech parts from the audio data 122, (e.g., by applying a voice activity detector). In some examples, the segmentation module 210 further segments speaker segments 225 that exceed a segment duration threshold, described in greater detail below.

The segmentation module 210 segments the input audio signal 122 into the plurality of speaker segments 225 by segmenting the input audio signal 122 into initial speaker segments 225 each bounded by the corresponding timestamps 223 of a respective pair of adjacent speaker turn tokens 224. For example, the input audio signal 122 may include fifteen seconds of audio with the sequence speaker turn tokens 224 having timestamps 223 at three seconds, six seconds, and fourteen seconds. In this instance, the segmentation module 210 segments the input audio signal into three initial speaker segments 225 bounded by the speaker turn tokens 224 with timestamps 223 at three seconds, six seconds, and fourteen seconds.

In some implementations, initial speaker segments 225 may have a respective duration that exceeds a segment duration threshold. In these implementations, the segmentation module 210 further segments initial speaker segments 225 into two or more reduced-duration speaker segments 225 that have respective durations less than or equal to the segment duration threshold. Continuing with the above example, the segmentation module may determine the initial speaker segment 225 bounded by the speaker turn tokens 224 timestamped at six seconds and fourteen seconds (e.g., having a duration of eight seconds) exceeds a segment duration threshold of six seconds. In this scenario, the segmentation module 210 may further segment the initial speaker segment 225 into two or more reduced-duration speaker segments 225 having respective durations less than or equal to the segment duration threshold. Here, the segmentation module 210 may segment the eight second initial speaker segment 225 into a first reduced-duration speaker segment 225 that has a duration of six seconds and a second reduced-duration speaker segment 225 that has a duration of two seconds. Accordingly, the plurality of speaker segments 225 segmented from the input audio signal 122 may include both the initial speaker segments 225 having respective durations less than or equal to the segment duration threshold and the reduced-duration speaker segments 225 further segmented from any of the initial speaker segments 225 having respective durations that exceed the segment duration threshold.

The speaker encoder 230 is configured to receive the plurality of speaker segments 225 and, for each speaker segment 225 of the plurality of speaker segments 225, extract a corresponding speaker-discriminative embedding 240 from the speaker segment 225 as output. Thereafter, the speaker encoder provides an observation sequence of embeddings $X=(x_1, x_2, \ldots, x_T)$ to the clustering module 260, where entry $x_T$ in the sequence represents a real-valued speaker-discriminative embedding 240 associated with a corresponding speaker segment 225 in the audio data 122 of the original utterance 120. The speaker-discriminative embeddings 240 may include speaker vectors such as d-vectors or i-vectors.

In some examples, the speaker encoder 230 may include a text-independent speaker encoder model trained with a generalized end-to-end extended-set softmax loss. The speaker encoder may include a long-short term memory-based (LSTM-based) speaker encoder model configured to extract the corresponding speaker-discriminative embedding 240 from each speaker segment 225. In particular, speaker encoder 230 includes (3) long short-term memory (LSTM) layers with 768 nodes and a projection size of 256. Here, the output of the last LSTM is transformed to a final 256-dimsonon d-vector.

In some implementations, the each speaker turn token 224 in the sequence of speaker turn tokens 224 resets the LSTM states of the speaker encoder 230 such that the speaker-discriminative embeddings 240 do not include information from other speaker segments 225. For instance, the speaker encoder 230 may only extract a speaker-discriminative embedding 240 corresponding to a portion of the speaker segment 225. Accordingly, the speaker-discriminative embedding 240 includes sufficient information from the speaker segment 225, but is not too close to the speaker turn boundary such that the speaker-discriminative embedding 240 may include inaccurate information or contain overlapping speech from another speaker 10.

The clustering module 260 receives the speaker-discriminative embeddings 240 for each speaker segment 225 and the pairwise constraints 226, and is configured to predict speaker labels 250 for each speaker-discriminative embedding 240. Simply put, the clustering module 260 predicts which speaker 10 spoke each speaker segment 225. More specifically, the clustering module 260 performs spectral clustering on the speaker-discriminative embeddings 240 extracted from the plurality of speaker segments 225 to cluster the plurality of speaker segments 225 into k classes 262. The k classes 262 represents the predicted number of active speakers included in the received utterance 120. Thereafter, for each respective class 262 of the k classes 262, the clustering module 260 assigns a respective speaker label 250 to each speaker segment 225 clustered into the respective class 262 that is different than the respective speaker label 250 assigned to the speaker segments 225 clustered into each other class 262 of the k classes 262.

The ASR model 300 may also generate the pairwise constraints 226 to further constrain the spectral clustering performed on the speaker-discriminative embeddings 240. That is, the ASR model 300 may predict a confidence for each speaker turn token 224 detected in the transcription 220. Moreover, the pairwise constraints 226 may indicate contextual information about adjacent speaker segments 225. For instance, adjacent speaker segments 225 may include any combination of both speaker segments 225 having a duration less than the segment duration threshold, one speaker segment 225 having a duration less than the segment duration threshold and one speaker segment 225 having a reduced-duration (i.e., initial speaker segment exceeded segment duration threshold), or both speaker segments 225 having reduced-durations. The confidence of the respective speaker turn detected in the transcription 220 and the context information (collectively referred to as constraints 226), are used to further constrain the spectral clustering by the clustering module 260.

In some implementations, the clustering module 260 performs spectral clustering performed on the speaker-discriminative embeddings 240 that is constrained by the pairwise constraints 226 received from the ASR model 300. For instance, when the both speaker segments 225 have durations less than the segment duration threshold, spectral clustering is constrained to encourage speaker labels 250 to be different for adjacent speaker segments 225 separated by speaker turn tokens with a high confidence. In other instances, when both speaker segments 225 have reduced-durations, the spectral clustering is constrained to encourage speaker labels for adjacent speaker segments 225 to be the same. That is, because the adjacent reduced-duration speaker segments 225 were divided based on exceeding the segment duration threshold rather than a speaker turn token 224, there is a high likelihood that the adjacent reduced-duration speaker segments 225 are spoken by the same speaker 10. In some examples, when one speaker segment 225 having a duration less than the segment duration threshold is adjacent to another speaker segment 225 having a reduced-duration, the spectral clustering is constrained based on the confidence of the speaker turn token 224. Here, when the speaker turn token 224 has a high confidence value, the clustering module 260 is constrained to encourage different speaker labels 250. Alternatively, when the speaker turn token 224 has a low confidence value, the clustering module 260 may be constrained to encourage the same speaker label 250.

In some implementations, the diarization system 200 annotates the transcription 220 of the utterances 120 based on the speaker label 250 assigned to each speaker segment 225 (i.e., diarization results 280). For instance, a transcription 220 of a conversation between multiple speakers 10 may be indexed by speaker to associated portions of the transcription 220 with the respective speaker 10 for identifying what each speaker 10 said in the transcription 220. The annotated transcription 220 may be stored in memory hardware 114, 146 of the user device 110 or the cloud computing environment 140 to be accessed later by one of the speakers 10.

Figure 2:
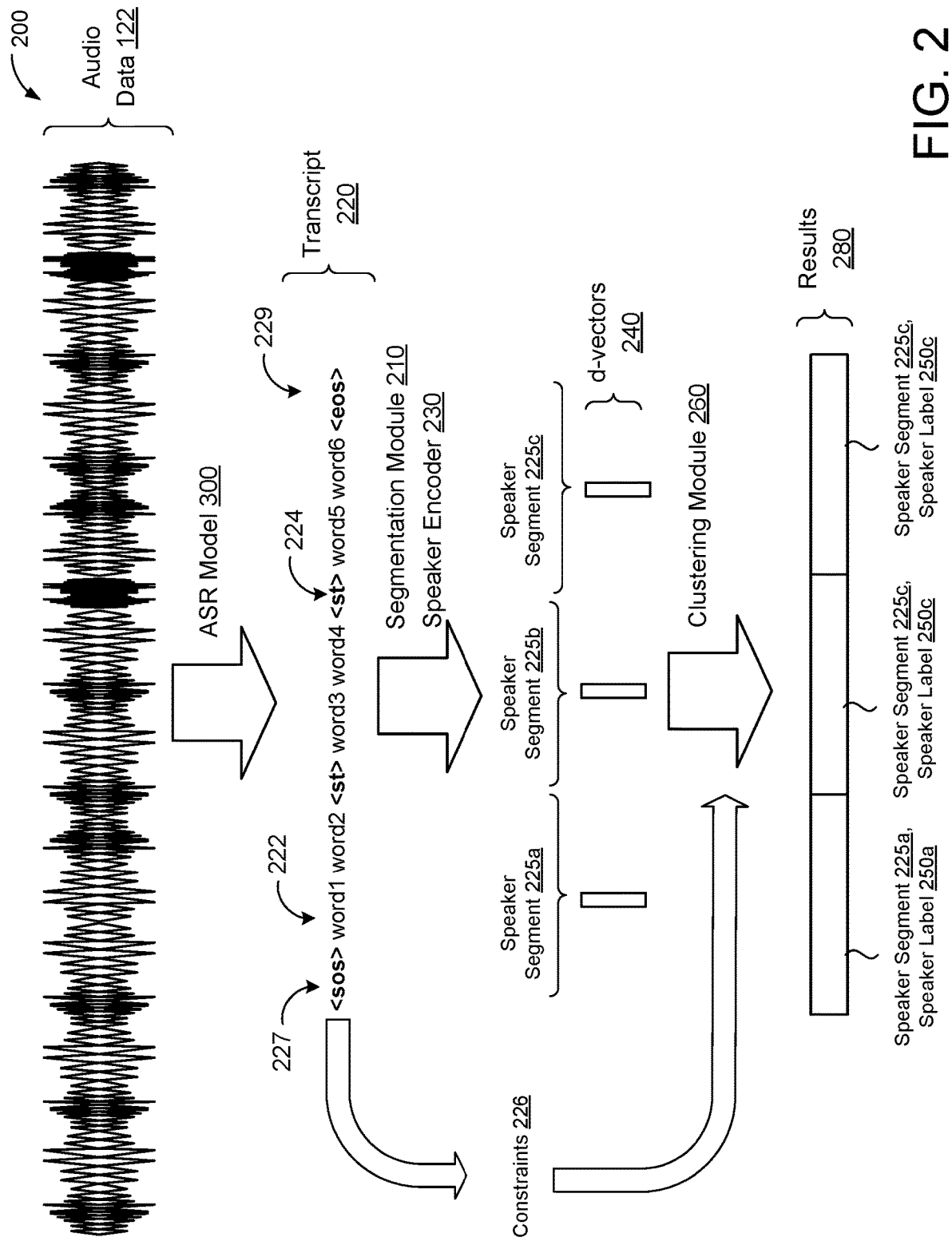
FIG. 2 is a schematic view of the example speaker diarization system of FIG. 1.

FIG. 2 illustrates a schematic view of the diarization system 200 that includes the ASR model (i.e., transformer transducer) 300, the segmentation module 210, the speaker encoder 230, and the clustering module 260. The ASR model 300 processes the input audio signal 122 corresponding to the utterances 120 spoken by the multiple speakers 10 (FIG. 1) to generate the transcriptions 220 of the utterances and the sequence of speaker turn tokens 224. The transcription 220 includes one or more terms 222 corresponding to words spoken by the multiple speakers. The sequence of speaker turn tokens 224 indicates a location of a respective speaker turn detected in the transcription 220 between a respective pair of adjacent terms 222. In the example shown, the input audio signal 122 may include an utterance where first and second terms 222 were spoken by a first speaker 10, third and fourth terms 222 were spoken by a second speaker 10, and fifth and sixth terms 222 were spoken by a third speaker 10. Here, the ASR model 300 generates a first speaker token 224 between the second term 222 and the third term 222 to indicate the speaker turn from the first speaker to the second speaker, and a second speaker token 224 between the fourth term 222 and fifth term 222 to indicate the speaker turn from the second speaker to the third speaker. Moreover, in some examples, the ASR model 300 generates a start of speech (SOS) token 227 that indicates the start of an utterance and an end of speech (EOS) token 229 that indicates the end of an utterance.

In some implementations, the ASR model 300 processes acoustic information and/or semantic information to detect speaker turns in the input audio signal 122. That is, using natural language understanding (NLU) the ASR model 300 can determine for an utterance "How are you I'm good," that "how are you" and "I'm good" were likely spoken by different users independent of any acoustic processing of the input audio signal 122. This semantic interpretation of the transcription 220 may be used independently or in conjunction with acoustic processing of the input audio signal 122.

The speaker encoder 230 receives the plurality of speaker segments 225 from the segmentation module 210 (FIG. 1) and extracts the corresponding speaker-discriminative embedding 240 for each speaker segment 225. The speaker-discriminative embeddings 240 may include speaker vectors such as d-vectors or i-vectors. The speaker encoder 230 provides the speaker-discriminative embeddings 240 associated with each speaker segment 225 to the clustering module 260.

The clustering module 260 receives the speaker-discriminative embeddings 240 for each speaker segment 225 and the pairwise constraints 226, and is configured to predict speaker labels 250 for each speaker-discriminative embedding 240. Given a set of N data samples (e.g., $x_1, x_2, \ldots, x_T$), the clustering module 260 constructs a similarity graph by computing pairwise similarities $a_{ij}$ where A represents the affinity matrix $E \in \mathbb{R}^{N \times N}$ of the similarity graph. Moreover, the affinity of two samples $x_i$ and $x_j$ may be represented by $$a_{ij} = \frac{1}{2}(1 + \cos(x_i, x_j)).$$

The clustering module 260 identifies a partition so that edges connecting different clusters have low eights, and edges within a cluster have high weights. Generally, the similarity graph is connected or only includes a few connected components and very few isolated vertices. Spectral clustering is sensitive to quality and noises of the similarity graph, therefore, the clustering module 260 performs several refinement operations on the affinity matrix to model the local neighborhood relationships between data samples. One refinement operation includes row-wise thresholding with p-percentile that sets diagonal values of the affinity matrix to 0, sets affinity values that are larger than the p-percentile values to 1, multiply affinity values by 0.01 that are smaller than the p-percentile of the row, and resetting diagonal values of the affinity matrix to 1. Another refinement operation includes applying an average summarization operation to make the affinity matrix positive semi-definite using the following equation, $$A = \frac{1}{2}(A + A^T).$$

The diarization error rate (DER) is significantly affected by the hyper parameter p for the p-percentile. Accordingly, a ratio value r(p) is a good proxy of the DER such that maximum eigengap is large while not generating an excessive amount of connections in the similarity graph.

Given the affinity matrix A, an unnormalized Laplacian matrix L is defined by L=D−A while a normalized Laplacian matrix $\bar{L}$ is defined by $\bar{L}=D^{-1/2}LD^{-1/2}$. Here, D represents the diagonal matrix defined as $\{d_i = \Sigma_{j=1}^{N} a_{ij}\}$. To perform spectral clustering, the clustering module 260 applies eigen-decomposition to estimate the number of k classes 262 using the maximum eigengap method. The clustering module 260 chooses the first class k 262 of eigen-vectors and applies a row-wise re-normalization of the spectral embeddings and applies k-means algorithm on the spectral embeddings to predict speaker labels 250.

The clustering module 260 receives pairwise constraints 226 indicating the confidence of the speaker turn tokens 224 and context information to constrain the spectral clustering. The pairwise constraints 226 are configured to encourage different speaker labels 250 for adjacent speaker segments 225 with a high confidence speaker turn token 224 and encourage the same speaker labels 250 for adjacent speaker segments 225 with a low confidence speaker turn token 224. With pairwise constraints 226 Q constrained spectral clustering identifies one or more partitions that maximize constraint satisfaction and minimizes the cost on the similarity graph G. The pairwise constraints 226 may be represented by $Q \in \mathbb{R}^{N \times N}$. The clustering module 260 processes the constraint matrix Q by:

$$Q_{(i,j)} \begin{cases} +1, & \text{if } (i,j) \in ML \text{ and } c(<st>) > \sigma; \\ -1, & \text{if } (i,j) \in CL; \\ 0, & \text{Otherwise}. \end{cases} \quad (1)$$

Here, if there is a speaker turn between speaker segment 225 i and i+1, and the confidence of the speaker turn token c(<st>) is larger than a threshold σ, the clustering module 260 defines the adjacent speaker segments 225 as "cannot-link" (CL). The CL definition indicates that the speaker label 250 between the adjacent speaker segments 225 has a high likelihood of being different. If there is no speaker turn token 224 between adjacent speaker segments 225, the clustering module defines the adjacent speaker segments as "must-link" (ML). The ML definition indicates that the speaker label 250 between the adjacent speaker segments 225 has a high likelihood of being the same.

The ML defined adjacent speaker segments 225 are treated as a positive class and the CL defined adjacent speaker segments 225 as a negative class. The class labels (i.e., positive and negative), are propagated in vertical and horizontal directions respectively in the affinity matrix $\overline{A} = D^{-1/2} A D^{-1/2}$. In each iteration t, the initial constraint matrix is added to adjust Q(t). Moreover, a parameter $\alpha$, is used to control the relative amount of constraint information from adjacent speaker segments 225 and the initial constraints 226. The clustering module preforms vertical propagation first until the convergence and then horizontal propagation by the following algorithm:

---
Algorithm 1: Exhaustive and Efficient Constraint
Propagation (E2CP) method
Require: Initial constraint matrix Z = Q(0), matrix $\overline{A}$,
parameter $\alpha$.
  While: $Q_v(t)$ not converge to $Q_v^*$ do
    $Q_v(t+1) = \alpha \overline{A} Q_v(t) + (1 - \alpha)Z$ Vertical Propoagation
  end while
  While: $Q_h(t)$ not converge to $Q_h^*$ do
    $Q_h(t+1) = \alpha Q_h(t) \overline{A} + (1 - \alpha) Q_v^*$ Horizontal Propoagation
  end while
  Output $Q^* = Q_h^*$ as the final converged pairwise
  constraint matrix
---

Q* has a closed-form solution formulated by:

$$Q^* = Q_h^* = (1-\alpha) Q_v^* (I - \alpha \overline{A}^T)^{-1} = (1-\alpha)^2 (1-\alpha \overline{A})^{-1} Z (1 - \alpha \overline{A})^{-1} \quad (2)$$

Using the propagated constraint matrix Q*, the clustering module 260 obtains an adjusted affinity matrix $\hat{A}_{ij}$ by:

$$\hat{A}_{ij} = \begin{cases} 1 - (1 - Q_{ij}^*)(1 - A_{ij}), & \text{If } Q_{ij}^* \geq 0; \\ (1 + Q_{ij}^*) A_{ij}, & \text{If } Q_{ij}^* < 0. \end{cases} \quad (3)$$

For constraint $Q_{ij} > 0$, the affinity matrix increases the similarity between sample $x_i$ and $x_j$. Alternatively, for $Q_{ij} < 0$, the affinity matrix decreases the similarity between $x_i$ and $x_j$. After this operation, the clustering module 260 performs normalized Laplacian matrix based spectral clustering to predict speaker labels 250 for the speaker segments 225. The clustering module 260 generates diarization results 280 include a first speaker label 250a that indicates the first speaker spoke a first speaker segment 225a (i.e., first and second terms 222), a second speaker label 250b that indicates the second speaker spoke a second speaker segment 225b (i.e., third and fourth terms 222), and a third speaker label 250c that indicates the third speaker spoke a third speaker segment 225c (i.e., fifth and sixth terms 222).

Figure 3:
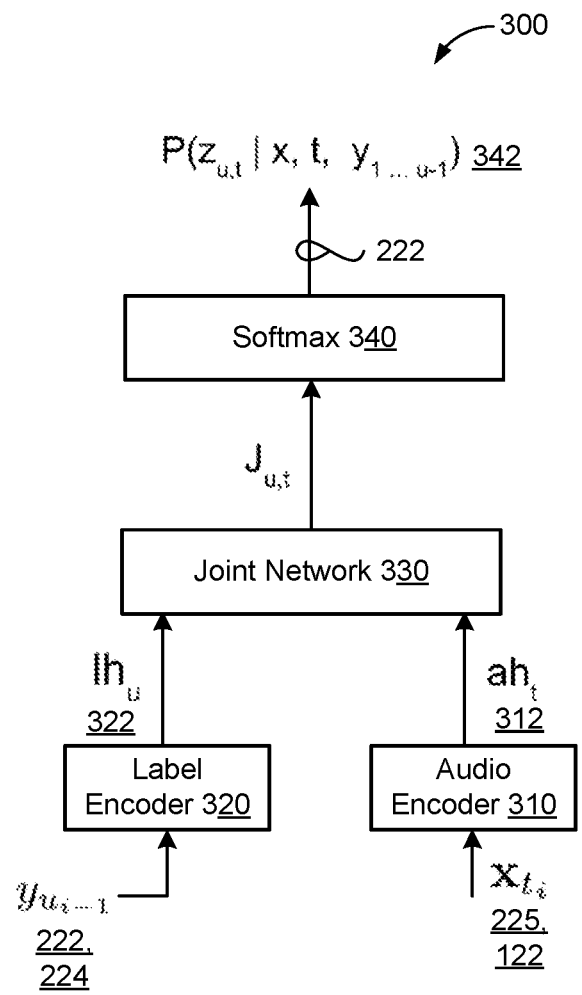
FIG. 3 is a schematic view of an example automatic speech recognition model with a transducer-based architecture.

With reference to FIG. 3, the ASR model 300 may provide end-to-end (E2E) speech recognition by integrating acoustic, pronunciation, and language models into a single neural network, and does not require a lexicon or a separate text normalization component. Various structures and optimization mechanisms can provide increased accuracy and reduced model training time. The ASR model 300 may include a steaming Transformer-Transducer (T-T) model architecture, which adheres to latency constraints associated with interactive applications. The ASR model 300 may similarly include a RNN-T model architecture or a Conformer-Transducer (C-T) model architecture. The ASR model 300 provides a small computational footprint and utilizes less memory requirements than conventional ASR architectures, making the T-T model architecture suitable for performing speech recognition entirely on the user device 110 (e.g., no communication with the cloud computing environment 140 is required). The ASR model 300 includes an audio encoder 310, a label encoder 320, and a joint network 330. The audio encoder 310, which is roughly analogous to an acoustic model (AM) in a traditional ASR system, includes a neural network having a plurality of transformer layers. For instance, the audio encoder 310 reads a sequence of d-dimensional feature vectors (e.g., speaker segments 225 (FIG. 1)) $x = (x_1, x_2, \ldots, x_T)$, where $x_t \in \mathbb{R}_d$, and produces at each time step a higher-order feature representation 312. Here, each speaker segment 225 (FIG. 1) includes a sequence of acoustic frames (e.g., audio data 122) that corresponds to the respective speaker segment 225 (FIG. 1). This higher-order feature representation is denoted as $ah_1, \ldots, ah_T$.

Similarly, the label encoder 320 may also include a neural network of transformer layers or a look-up table embedding model, which, like a language model (LM), processes the sequence of non-blank symbols output by a final Softmax layer 340 so far, $y_0, \ldots, y_{ui-1}$, (e.g., the one or more terms 222 including speaker turn tokens 224 as shown in FIG. 2) into a dense representation 322 (denoted by $lh_u$) that encodes predicted label history. In implementations when the label encoder 320 includes the neural network of transformer layers, each transformer layer may include a normalization layer, a masked multi-head attention layer with relative position encoding, a residual connection, a feed forward layer, and a dropout layer. In these implementations, the label encoder 320 may include two transformer layers. In implementations when the label encoder 320 includes the look-up table embedding model with a bi-gram label context, the embedding model is configured to learn a weight vector of the d-dimension for each possible bigram label context, where d is the dimension of the outputs of the audio and label encoders 310, 320. In some examples, the total number of parameters in the embedding model is $N^2 \times d$ where N is the vocabulary size of the labels. Here, the learned weight vector is then used as the embedding of the bigram label context in the ASR model 300 to produce fast label encoder 320 runtimes.

Finally, with the T-T model architecture, the representations produced by the audio and label encoders 310, 320 are combined by the joint network 330 using a dense layer Jo. The joint network 330 then predicts $P(z_{u,t} | x, t, y_1, \ldots, y_{u-1})$, which is a distribution over the next output symbol. Stated differently, the joint network 330 generates, at each output step (e.g., time step), a probability distribution over possible speech recognition hypotheses 342 for the one or more terms 222 of the transcription 220 (FIG. 2). Here, the "possible speech recognition hypotheses" correspond to a set of output labels (also referred to as "speech units") each representing a grapheme (e.g., symbol/character), term 222 (FIG. 2), or a word piece in a specified natural language. For example, when the natural language is English, the set of output labels may include twenty-seven (27) symbols, e.g., one label for each of the 26-letters in the English alphabet and one label designating a space. Accordingly, the joint network 330 may output a set of values indicative of the likelihood of occurrence of each of a predetermined set of output labels. This set of values can be a vector (e.g., a one-hot vector) and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 330 can include a posterior probability value for each of the different output labels. Thus, if there are 100 different output labels representing different graphemes or other symbols, the output $z_{u,t}$ of the joint network 330 can include 100 different probability values, one for each output label. The probability distribution can then be used to select and assign scores to candidate orthographic elements (e.g., graphemes, wordpieces, and/or words) in a beam search process (e.g., by the Softmax layer 340) for determining the transcription.

The Softmax layer 340 may employ any technique to select the output label/symbol with the highest probability in the distribution as the next output symbol predicted by the ASR model 300 at the corresponding output step. In this manner, the ASR model 300 does not make a conditional independence assumption, rather the prediction of each symbol is conditioned not only on the acoustics but also on the sequence of labels output so far.

Figure 4:
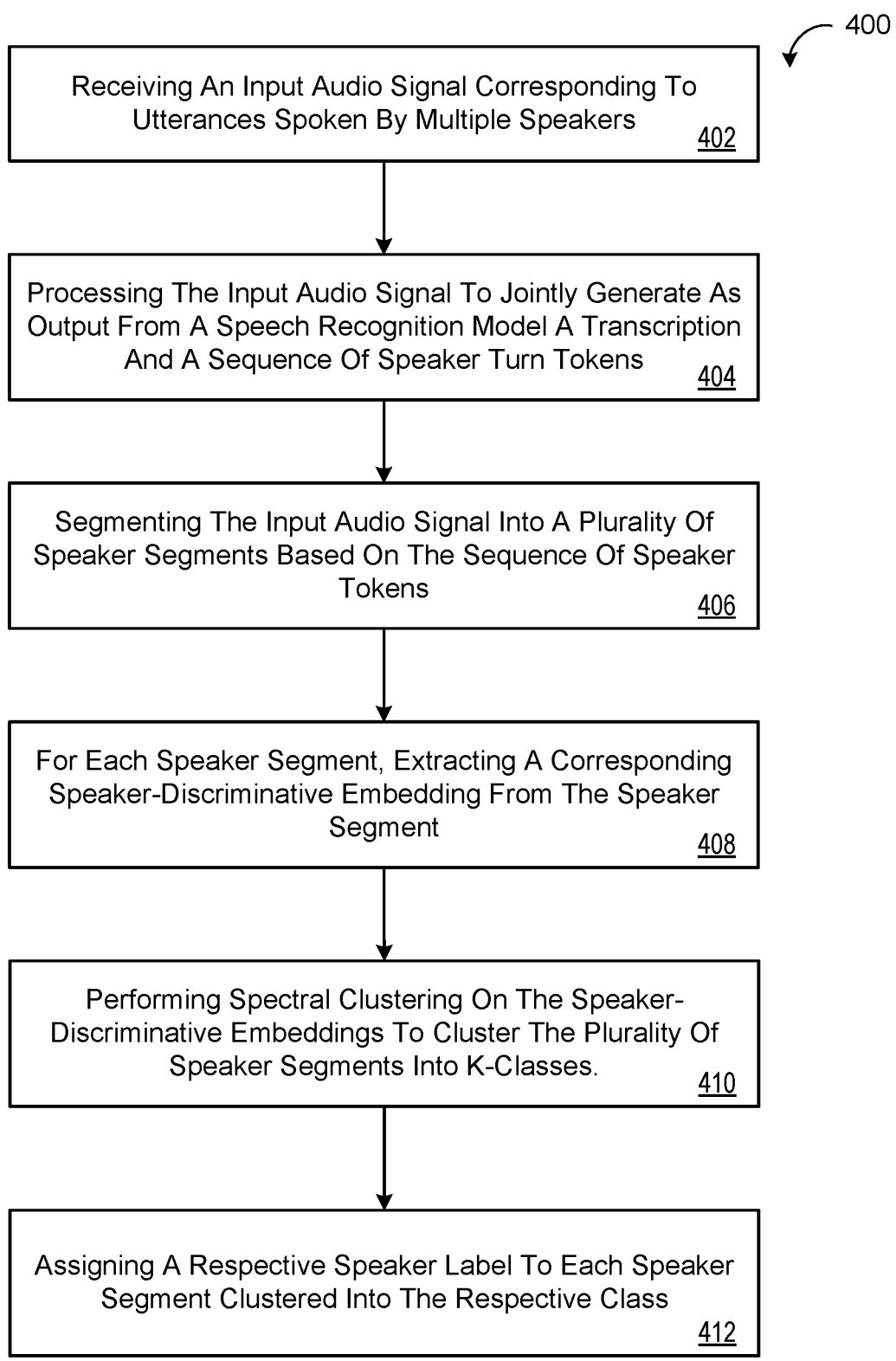
FIG. 4 is a flowchart of an example arrangement of operations for a computer-implemented method of performing speaker diarization on an input audio signal containing utterances of speech spoken by multiple different speakers.

FIG. 4 is a flowchart of an exemplary arrangement of operations for a computer-implemented method 400 of performing speaker diarization on a received utterance 120 of speech. The data processing hardware 112, 144 may execute the operations for the method 400 by executing instructions stored on the memory hardware 114, 146. At operation 402, the method 400 includes receiving an input audio signal 122 corresponding to utterances 120 spoken by multiple speakers 10, 10a-n. At operation 404, the method 400 includes processing, using a speech recognition model (e.g., ASR model) 300, the input audio signal 122 to jointly generate as output from the speech recognition model 300 a transcription 220 of the utterances 120 and a sequence of speaker turn tokens 224, 224a-n. Each speaker turn token 224 indicates a location of a respective speaker turn detected in the transcription 220 between a respective pair of adjacent terms 222. At operation 406, the method 400 includes segmenting the input audio signal 122 into a plurality of speaker segments 225 based on the sequence of speaker tokens 224.

At operation 408, the method 400 includes, for each speaker segment 225 of the plurality of speaker segments 225, extracting a corresponding speaker-discriminative embedding 240 from the speaker segment 225. At operation 410, the method 400 includes performing spectral clustering on the speaker-discriminative embeddings 240 extracted from the plurality of speaker segments 225 to cluster the plurality of speaker segments 225 into k classes 262. At operation 412, the method 400 includes, for each respective class 262 of the k classes 262, assigning a respective speaker label 250 to each speaker segment 225 clustered into the respective class 262 that is different than the respective speaker label 250 assigned to the speaker segments 225 clustered into each other class 262 of the k classes 262.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
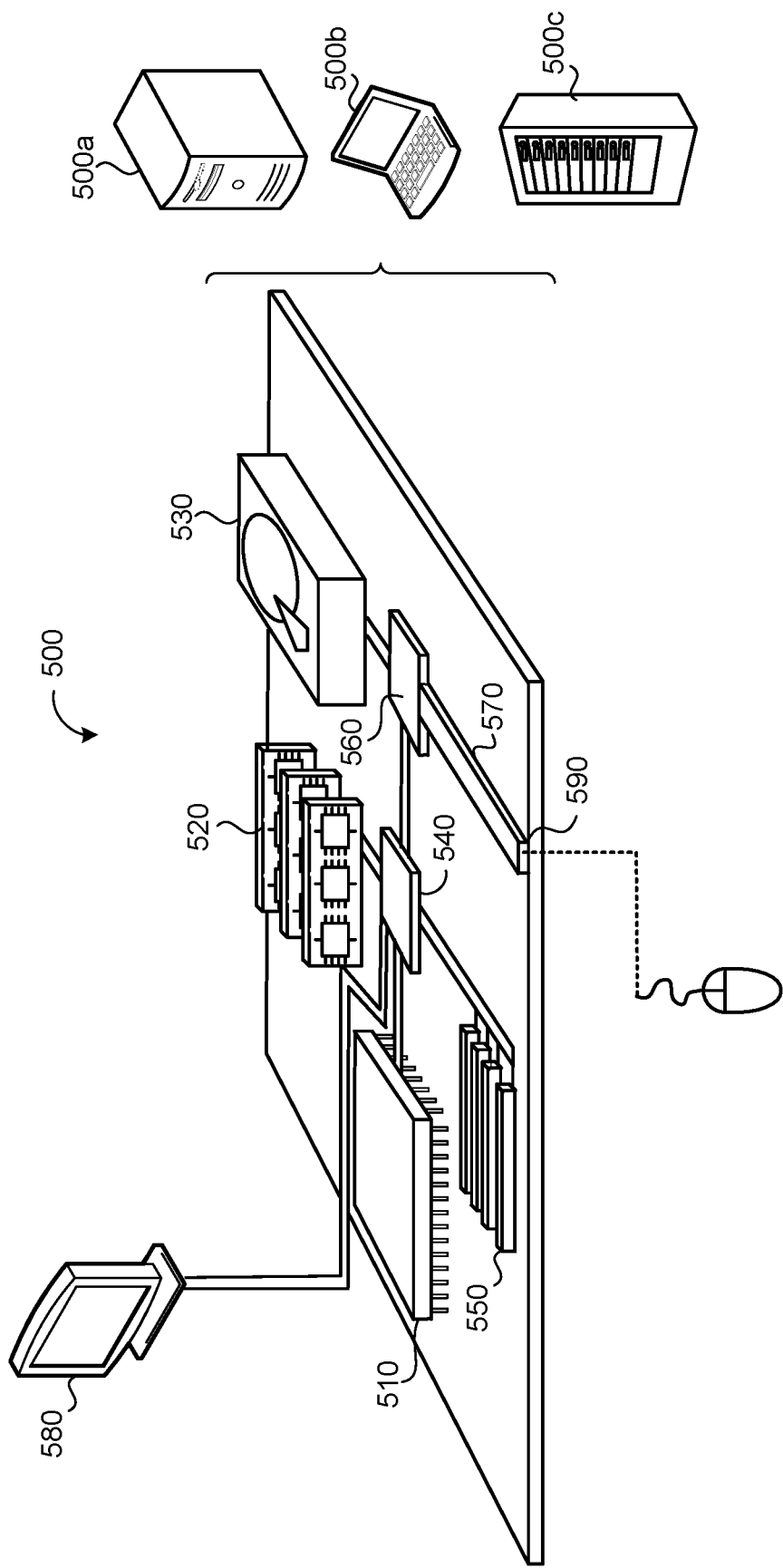
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
receiving an input audio signal corresponding to utterances spoken by multiple speakers;
before segmenting the input audio signal, processing, using a speech recognition model, the input audio signal to jointly generate as output from the speech recognition model:
a transcription of the utterances; and
a sequence of speaker turn tokens based on semantic information of the transcription, each speaker turn token indicating a location of a respective speaker turn detected in the transcription and located between a respective pair of adjacent terms of the transcription spoken by different speakers;

segmenting the input audio signal into a plurality of speaker segments based on the sequence of speaker turn tokens;

for each speaker segment of the plurality of speaker segments, extracting a corresponding speaker-discriminative embedding from the speaker segment;

performing spectral clustering on the speaker-discriminative embeddings extracted from the plurality of speaker segments to cluster the plurality of speaker segments into k classes; and for each respective class of the k classes, assigning a respective speaker label to each speaker segment clustered into the respective class that is different than the respective speaker label assigned to the speaker segments clustered into each other class of the k classes.

2. The computer-implemented method of claim 1, wherein the operations further comprise annotating the transcription of the utterances based on the speaker label assigned to each speaker segment.

3. The computer-implemented method of claim 1, wherein:

each speaker turn token in the sequence of speaker turn tokens has a corresponding timestamp; and segmenting the input audio signal into the plurality of speaker segments based on the sequence of speaker turn tokens comprises segmenting the input audio signal into initial speaker segments each bounded by the corresponding timestamps of a respective pair of adjacent speaker turn tokens in the sequence of speaker turn tokens.

4. The computer-implemented method of claim 3, wherein the operations further comprise:

for each initial speaker segment having a respective duration that exceeds a segment duration threshold, further segmenting the initial speaker segment into two or more reduced-duration speaker segments having respective durations less than or equal to the segment duration threshold, wherein the plurality of speaker segments segmented from the input audio signal comprise:

the initial speaker segments having respective durations less than or equal to the segment duration threshold; and the reduced-duration speaker segments further segmented from any of the initial speaker segments having respective durations that exceed the segment duration threshold.

5. The computer-implemented method of claim 1, wherein extracting a corresponding speaker-discriminative embedding from the speaker segment comprises:

receiving, as input to a speaker encoder model, the speaker segment; and generating, as output from the speaker encoder model, the corresponding speaker-discriminative embedding.

6. The computer-implemented method of claim 5, wherein the speaker encoder model comprises a long-short term memory-based (LSTM-based) speaker encoder model configured to extract the corresponding speaker-discriminative embedding from each speaker segment.

7. The computer-implemented method of claim 1, wherein the operations further comprise:

for each speaker turn token in the sequence of speaker turn tokens generated as output from the speech recognition model, predicting a confidence of the respective speaker turn detected in the transcription; and determining pairwise constraints based on the confidences predicted for the speaker turn token, wherein the spectral clustering performed on the speaker-discriminative embeddings is constrained by the pairwise constraints.

8. The computer-implemented method of claim 1, wherein the speech recognition model comprises a streaming transducer-based speech recognition model comprising:

an audio encoder configured to:
receive, as input, a sequence of acoustic frames; and
generate, at each of a plurality of time steps, a higher order feature representation for a corresponding acoustic frame in the sequence of acoustic frames;

a label encoder configured to:
receive, as input, a sequence of non-blank symbols output by a final softmax layer; and
generate, at each of the plurality of time steps, a dense representation; and a joint network configured to:
receive, as input, the higher order feature representation generated by the audio encoder at each of the plurality of time steps and the dense representation generated by the label encoder at each of the plurality of time steps; and
generate, at each of the plurality of time steps, a probability distribution over possible speech recognition hypotheses at the corresponding time step.

9. The computer-implemented method of claim 8, wherein the audio encoder comprises a neural network having a plurality of transformer layers.

10. The computer-implemented method of claim 8, wherein the label encoder comprises a bigram embedding lookup decoder model.

11. The computer-implemented method of claim 1, wherein the speech recognition model is trained on training samples that each comprise training utterances spoken by two or more different speakers paired with a corresponding ground-truth transcription of the training utterances, each ground-truth transcription injected with ground-truth speaker turn tokens indicating locations where speaker turns occur in the ground-truth transcription.

12. The computer-implemented method of claim 11, wherein the corresponding ground-truth transcription of each training sample is not annotated with any timestamp information.

13. A system comprising
data processing hardware;
memory hardware in communication with the data processing hardware and storing instructions, that when executed by the data processing hardware, cause the data processing hardware to perform operations comprising:

receiving an input audio signal corresponding to utterances spoken by multiple speakers;

before segmenting the input audio signal, processing, using a speech recognition model, the input audio signal to jointly generate as output from the speech recognition model:
a transcription of the utterances; and
a sequence of speaker turn tokens based on semantic information of the transcription, each speaker turn token indicating a location of a respective speaker turn detected in the transcription and located between a respective pair of adjacent terms of the transcription spoken by different speakers;

segmenting the input audio signal into a plurality of speaker segments based on the sequence of speaker turn tokens;

for each speaker segment of the plurality of speaker segments, extracting a corresponding speaker-discriminative embedding from the speaker segment;

performing spectral clustering on the speaker-discriminative embeddings extracted from the plurality of speaker segments to cluster the plurality of speaker segments into k classes; and for each respective class of the k classes, assigning a respective speaker label to each speaker segment clustered into the respective class that is different than the respective speaker label assigned to the speaker segments clustered into each other class of the k classes.

14. The system of claim 13, wherein the operations further comprise annotating the transcription of the utterances based on the speaker label assigned to each speaker segment.

15. The system of claim 13, wherein:
each speaker turn token in the sequence of speaker turn tokens has a corresponding timestamp; and
segmenting the input audio signal into the plurality of speaker segments based on the sequence of speaker turn tokens comprises segmenting the input audio signal into initial speaker segments each bounded by the corresponding timestamps of a respective pair of adjacent speaker turn tokens in the sequence of speaker turn tokens.

16. The system of claim 15, wherein the operations further comprise:
for each initial speaker segment having a respective duration that exceeds a segment duration threshold, further segmenting the initial speaker segment into two or more reduced-duration speaker segments having respective durations less than or equal to the segment duration threshold,
wherein the plurality of speaker segments segmented from the input audio signal comprise:
the initial speaker segments having respective durations less than or equal to the segment duration threshold; and
the reduced-duration speaker segments further segmented from any of the initial speaker segments having respective durations that exceed the segment duration threshold.

17. The system of claim 13, wherein extracting a corresponding speaker-discriminative embedding from the speaker segment comprises:
receiving, as input to a speaker encoder model, the speaker segment; and
generating, as output from the speaker encoder model, the corresponding speaker-discriminative embedding.

18. The system of claim 17, wherein the speaker encoder model comprises a long-short term memory-based (LSTM-based) speaker encoder model configured to extract the corresponding speaker-discriminative embedding from each speaker segment.

19. The system of claim 13, wherein the operations further comprise:
for each speaker turn token in the sequence of speaker turn tokens generated as output from the speech recognition model, predicting a confidence of the respective speaker turn detected in the transcription; and
determining pairwise constraints based on the confidences predicted for the speaker turn token,
wherein the spectral clustering performed on the speaker-discriminative embeddings is constrained by the pairwise constraints.

20. The system of claim 13, wherein the speech recognition model comprises a streaming transducer-based speech recognition model comprising:
an audio encoder configured to:
receive, as input, a sequence of acoustic frames; and
generate, at each of a plurality of time steps, a higher order feature representation for a corresponding acoustic frame in the sequence of acoustic frames;
a label encoder configured to:
receive, as input, a sequence of non-blank symbols output by a final softmax layer; and
generate, at each of the plurality of time steps, a dense representation; and
a joint network configured to:
receive, as input, the higher order feature representation generated by the audio encoder at each of the plurality of time steps and the dense representation generated by the label encoder at each of the plurality of time steps; and
generate, at each of the plurality of time steps, a probability distribution over possible speech recognition hypothesis at the corresponding time step.

21. The system of claim 20, wherein the audio encoder comprises a neural network having a plurality of transformer layers.

22. The system of claim 20, wherein the label encoder comprises a bigram embedding lookup decoder model.

23. The system of claim 13, wherein the speech recognition model is trained on training samples that each comprise training utterances spoken by two or more different speakers paired with a corresponding ground-truth transcription of the training utterances, each ground-truth transcription injected with ground-truth speaker turn tokens indicating locations where speaker turns occur in the ground-truth transcription.

24. The system of claim 13, wherein the corresponding ground-truth transcription of each training sample is not annotated with any timestamp information.

* * * * *